(12) United States Patent
Venkataraman

(10) Patent No.: US 8,435,689 B2
(45) Date of Patent: May 7, 2013

(54) DUAL FUNCTION HEAT EXCHANGER FOR START-UP HUMIDIFICATION AND FACILITY HEATING IN SOFC SYSTEM

(75) Inventor: Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1350 days.

(21) Appl. No.: 11/907,205

(22) Filed: Oct. 10, 2007

(65) Prior Publication Data

US 2008/0096073 A1    Apr. 24, 2008

Related U.S. Application Data

(60) Provisional application No. 60/853,443, filed on Oct. 23, 2006.

(51) Int. Cl.
*H01M 8/04*    (2006.01)

(52) U.S. Cl.
USPC ............ 429/434; 429/413; 429/414; 429/433

(58) Field of Classification Search ................ 429/413, 429/414, 433, 434
See application file for complete search history.

(56) References Cited

U.S. PATENT DOCUMENTS

| | | |
|---|---|---|
| 3,488,266 A | 1/1970 | French |
| 4,041,210 A | 8/1977 | Van Dine |
| 4,182,795 A | 1/1980 | Baker et al. |
| 4,532,192 A | 7/1985 | Baker et al. |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,079,105 A | 1/1992 | Bossel |
| 5,084,362 A | 1/1992 | Farooque |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,366,819 A | 11/1994 | Harvigsen et al. |
| 5,441,821 A | 8/1995 | Merritt et al. |
| 5,498,487 A | 3/1996 | Ruka et al. |

(Continued)

FOREIGN PATENT DOCUMENTS

| | | |
|---|---|---|
| WO | WO 2004/013258 A1 | 2/2004 |
| WO | WO 2004/049481 A2 | 6/2004 |
| WO | WO 2004049481 A2 * | 6/2004 |
| WO | WO 2004/093214 | 10/2004 |

OTHER PUBLICATIONS

U.S. Appl. No. 11/491,487, filed Jul. 24, 2006, McElroy et al.

(Continued)

*Primary Examiner* — Zachary Best
(74) *Attorney, Agent, or Firm* — The Marbury Law Group PLLC

(57) ABSTRACT

A fuel cell system includes a fuel cell stack and a heat exchanger. The heat exchanger vaporizes water which is provided to the fuel cell stack during start-up of the fuel cell system and heats a heat transfer medium which is provided to a facility associated with the fuel cell system during steady-state operation of the fuel cell system.

11 Claims, 2 Drawing Sheets

U.S. PATENT DOCUMENTS

| | | | |
|---|---|---|---|
| 5,501,914 A | 3/1996 | Satake et al. | |
| 5,505,824 A | 4/1996 | Mcelroy | |
| 5,527,631 A | 6/1996 | Singh et al. | |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,763,114 A | 6/1998 | Khandkar et al. | |
| 5,955,039 A | 9/1999 | Dowdy | |
| 6,013,385 A | 1/2000 | Dubose | |
| 6,051,125 A | 4/2000 | Pham et al. | |
| 6,054,229 A | 4/2000 | Hsu et al. | |
| 6,280,865 B1 | 8/2001 | Eisman et al. | |
| 6,329,090 B1 | 12/2001 | Mcelroy et al. | |
| 6,348,278 B1 | 2/2002 | Lapierre et al. | |
| 6,403,245 B1 | 6/2002 | Hunt | |
| 6,436,562 B1 | 8/2002 | Dubose | |
| 6,451,466 B1 | 9/2002 | Grasso et al. | |
| 6,531,243 B2 | 3/2003 | Thom | |
| 6,623,880 B1 | 9/2003 | Geisbrecht et al. | |
| 6,749,958 B2 * | 6/2004 | Pastula et al. | 429/423 |
| 6,821,663 B2 | 11/2004 | Mcelroy | |
| 2001/0049035 A1 | 12/2001 | Haltiner, Jr. et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2002/0142208 A1 | 10/2002 | Keefer et al. | |
| 2003/0031904 A1 | 2/2003 | Haltiner | |
| 2003/0049502 A1 | 3/2003 | Dickman et al. | |
| 2003/0157386 A1 | 8/2003 | Gottmann | |
| 2003/0162067 A1 | 8/2003 | Mcelroy | |
| 2003/0196893 A1 | 10/2003 | Mcelroy | |
| 2003/0205641 A1 | 11/2003 | Mcelroy | |
| 2004/0089438 A1 | 5/2004 | Valensa et al. | |
| 2004/0131912 A1 | 7/2004 | Keefer et al. | |
| 2004/0146763 A1 * | 7/2004 | Pondo et al. | 429/26 |
| 2004/0191597 A1 | 9/2004 | Mcelroy | |
| 2004/0191598 A1 | 9/2004 | Gottmann | |
| 2004/0202914 A1 | 10/2004 | Sridhar et al. | |
| 2004/0224193 A1 | 11/2004 | Mitlitsky et al. | |
| 2005/0048334 A1 | 3/2005 | Sridhar et al. | |
| 2005/0048338 A1 | 3/2005 | Kobayashi et al. | |
| 2005/0056412 A1 | 3/2005 | Reinke et al. | |
| 2005/0164051 A1 | 7/2005 | Venkataraman | |
| 2006/0147771 A1 | 7/2006 | Russell et al. | |
| 2006/0248799 A1 | 11/2006 | Bandhauer et al. | |
| 2006/0251934 A1 | 11/2006 | Valensa et al. | |
| 2006/0251939 A1 | 11/2006 | Bandhauer et al. | |
| 2006/0251940 A1 | 11/2006 | Bandhauer et al. | |
| 2006/0257699 A1 * | 11/2006 | Hood et al. | 429/26 |

OTHER PUBLICATIONS

Austin, "Cell and Stack Construction: Low-Temperature Cells," *Fuel Cells: A Review of Government-Sponsored Research,* 1950-1964, NASA SP-120, pp. 101-102, (1967).

"Low Cost, High Efficiency Reversible Fuel Cell (and Electrolyzer) Systems," (Technology Management Inc.), Proceedings of the 2001 DOE Hydrogen Program Review NREL-CP-570-30535, pp. 1-7, (2001).

Milliken et al., "Low Cost, High Efficiency Reversible Fuel Cell Systems," Proceedings of the 2002 U.S. DOE Hydrogen Program Review, NREL-CP-610-32405, pp. 1-14, (2002).

Mitlitsky, et al., "Regenerative Fuel Cells for High altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL-CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

* cited by examiner

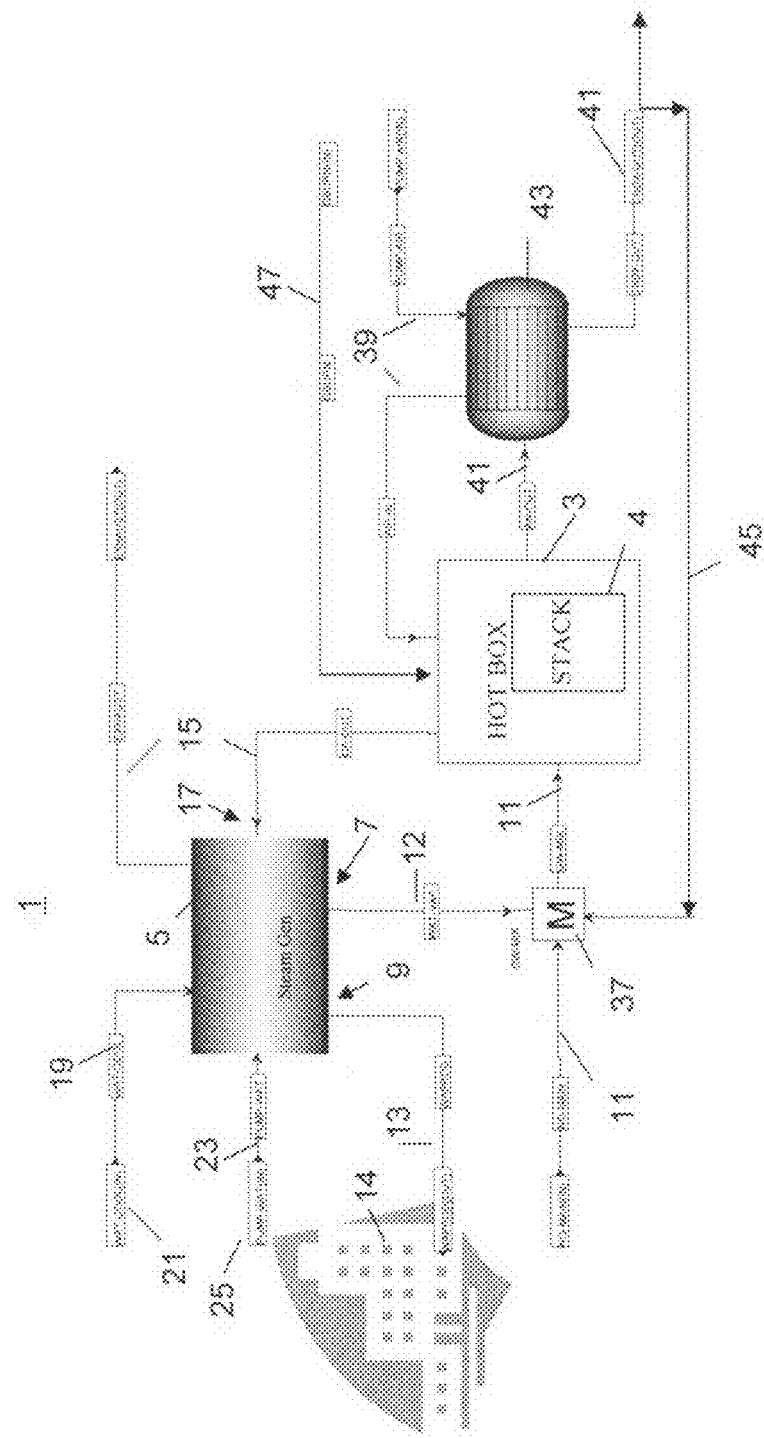

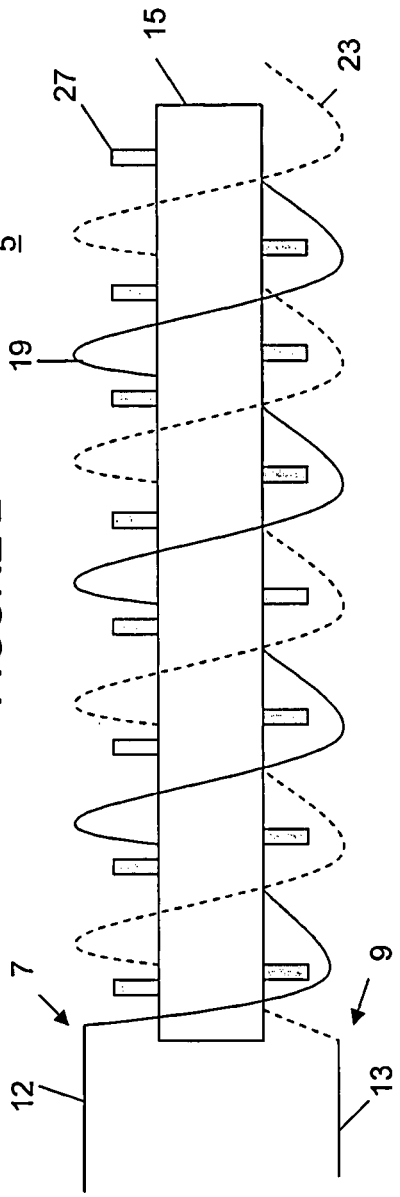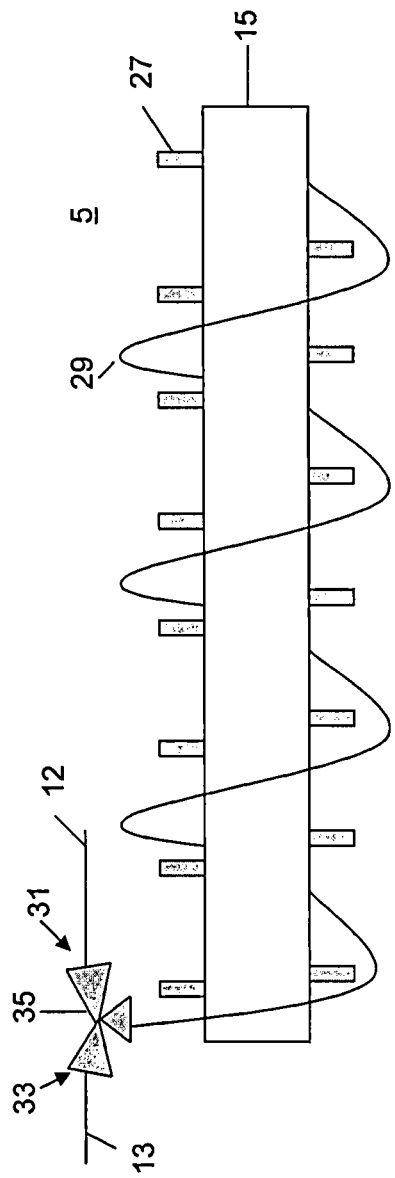

DUAL FUNCTION HEAT EXCHANGER FOR START-UP HUMIDIFICATION AND FACILITY HEATING IN SOFC SYSTEM

The present application claims benefit of priority of U.S. Provisional Patent Application Ser. No. 60/853,443 filed on Oct. 23, 2006, which is incorporated by reference in its entirety.

BACKGROUND OF THE INVENTION

The present invention is generally directed to fuel cell systems and more specifically to systems containing a dual function heat exchanger.

Solid oxide fuel (SOFC) systems operate at high temperatures in excess of 700° C. Frequently, heat transfer heat exchangers are provided to transfer by-product heat from the operating SOFC system to the heating systems of the facility in which the system is located.

During start-up of a SOFC system which utilizes steam reformation of a hydrocarbon fuel, water must be vaporized for the steam reforming process. This requires a device for accomplishing this purpose. In the prior art systems, dedicated humidification heat exchangers are frequently provided which use process heat in order to vaporize liquid water. However, these humidification heat exchangers often remain unutilized during steady-state operation of the system, especially if the inlet fuel stream is humidified by recycling a water vapor containing anode exhaust stream (i.e., the fuel exhaust stream) from the fuel cell stack into the fuel inlet stream being provided into the stack.

SUMMARY

An embodiment of the present invention provides a fuel cell system which includes a fuel cell stack and a heat exchanger. The heat exchanger vaporizes water which is provided to the fuel cell stack during start-up of the fuel cell system, and heats a heat transfer medium which is provided to a facility associated with the fuel cell system during steady-state operation of the fuel cell system.

BRIEF DESCRIPTION OF THE DRAWINGS

FIG. 1 is a schematic of a fuel cell system according to embodiments of the invention.

FIGS. 2 and 3 are schematic side views heat exchangers according to embodiments of the invention.

DETAILED DESCRIPTION OF THE PREFERRED EMBODIMENTS

A heat exchanger is used during the start-up of an fuel cell system, such as a SOFC system, for steam generation. The same heat exchanger is utilized to transfer by-product system heat to a customer facility during steady-state system operation. By combining these two functions in a single device, system cost and size are minimized.

In one embodiment of the invention, this heat exchanger uses the SOFC system cathode exhaust (i.e., the fuel cell stack air exhaust) heat for vaporizing liquid water during system start-up. The heat exchanger contains additional connections which may be made to the facility's heating system in order to generate steam or hot water using the cathode exhaust stream, and to provide the steam or hot water to the facility. The term facility includes buildings and other structures which are located nearby the SOFC system. For example, the SOFC system may be located outside of the building, such as in a yard or in a parking lot near the building, or the SOFC system may be located inside the building. The SOFC system is used to heat the water provided into the building through a pipe for any suitable steam or hot water usage, such as heating the building, hot tap water and/or industrial steam or hot water uses in industrial facilities.

It should be noted that while water is the preferred heat transfer medium, other heat transfer media may be used. For example, alcohol or organic liquids or even gases may be heated in the heat exchanger by the cathode exhaust stream. The hot heat transfer medium is then provided into the facility for heating and/or industrial uses. While less preferred, the anode exhaust stream may also be used to heat the heat transfer medium in the heat exchanger in addition to or instead of the cathode exhaust steam.

The heat exchanger operates as follows. During the fuel cell system start-up, the cathode exhaust heat is used to vaporize liquid water into steam. The steam is provided into the hydrocarbon fuel inlet stream, such as a methane or natural gas steam. The humidified hydrocarbon fuel inlet stream is then reformed in a reformer using steam-methane reformation reaction into a hydrogen containing fuel inlet stream which is then provided to the fuel cells of the fuel cell stack.

During normal or steady-state operation, when water need not be vaporized, heat exchange to the facility's heating system or other system is carried out. The heat exchanger thus has two feeds and/or outputs, one for stack process water and one for utility water for the facility.

FIG. 1 is a schematic illustration of the SOFC system 1 of one embodiment of the invention. The system 1 includes a hot box 3 containing one or more fuel cell stacks 4, such as SOFC stack(s), and associated equipment, such as an internal or external steam-methane reformer, fuel or air heat exchangers, etc. For example, hot box components described in U.S. application Ser. No. 11/002,681, filed on Dec. 9, 2004 and incorporated herein by reference in its entirety, may be used.

The system also includes a heat exchanger or vaporizer 5. The heat exchanger 5 vaporizes water to be provided to the fuel cell stack during start-up of the fuel cell stack and heats a heat transfer medium which is provided to the facility associated with the fuel cell system during steady-state operation of the fuel cell system 1.

A first output 7 of the heat exchanger 5 is fluidly connected to a fuel inlet conduit 11 of the fuel cell stack by an output conduit 12. A second output 9 of the heat exchanger is fluidly connected to a heat transfer medium conduit 13 being provided to the facility 14. Fluidly connected means directly or indirectly connected by one or more conduits such that a fluid can flow between the output of the heat exchanger and the desired destination. For example, this includes but is not limited to the output conduit 12 which connects the first output 9 of the heat exchanger 5 to the fuel inlet conduit 11. The input of the fuel inlet conduit is connected to a hydrocarbon fuel source, such as a natural gas line or a hydrocarbon fuel tank, such as a natural gas, methane, propane, methanol, etc., tank.

A cathode exhaust conduit 15 of the fuel cell stack in hot box 3 is fluidly connected to an input 17 of the heat exchanger 5. As shown in more detail in FIGS. 2 and 3, the cathode exhaust conduit 15 extends from a cathode exhaust of the fuel cell stack through the heat exchanger 5.

The system also contains a process steam conduit 19 which is thermally integrated with the cathode exhaust conduit 15 in the heat exchanger 5. Thermally integrated means positioned in such a way as to allow heat transfer between the conduits. An inlet of the process steam conduit 19 is connected to a liquid water source 21, such as a water pipe or a water tank. An outlet of the process steam conduit 19 is fluidly connected to the fuel inlet conduit 11 of the fuel cell stack, such as via the conduit 12.

The system 1 also contains a heat transfer medium conduit 23 which is thermally integrated with the cathode exhaust conduit 15 in the heat exchanger 5. An inlet of the heat transfer medium conduit 23 is connected to a liquid water source 25, which may be the same as or different from the water source 21. An outlet of the heat transfer medium conduit 21 is fluidly connected to the facility 14 heating system, such as a hot water or steam radiator network or a HVAC system for heating facility air, via conduit 13.

As shown in FIG. 2, the process steam conduit 19 and the heat transfer medium conduit 23 coil around the cathode exhaust conduit 15 in the heat exchanger 5. However, other heat exchanger configurations may also be used, such as a parallel plate configuration, a core-shell configuration where one conduit is located in an interior volume of another conduit, and other suitable configurations. If desired, the cathode exhaust conduit may contain fins 27 to further improve heat transfer.

In another embodiment of the invention shown in FIG. 3, a single steam conduit 29 is thermally integrated with the cathode exhaust conduit 15 in the heat exchanger 5. The inlet of the steam conduit 29 is connected to the liquid water source 21. One outlet 31 of the steam conduit 29 is fluidly connected to the fuel inlet conduit 11 of the fuel cell stack via conduit 12. A second outlet 33 of the steam conduit is fluidly connected to the facility 14 heating system via conduit 13. A valve or other flow regulator 35 may be used to steer the steam to the first outlet 31 during start-up operation and to steer steam or hot water to the second outlet 33 during steady-state operation. The steam conduit 29 may be coiled around the cathode exhaust conduit 15 in the heat exchanger 5. Alternatively, the heat exchanger may have other suitable configurations described above.

The system 1 may also have a mixer 37 which mixes the steam provided from the heat exchanger 5 with the hydrocarbon fuel provided in the fuel inlet conduit 11. The system also contains an air inlet conduit 39 which provides an inlet air stream to the stack, and an anode (i.e., fuel) exhaust conduit 41 which removes the anode exhaust from the stack. If desired, a second heat exchanger 43 may be provided which heats the air inlet stream using the hot anode exhaust stream. If desired, the anode exhaust stream may be recycled into the fuel inlet stream via conduit 45, as described in more detail in U.S. application Ser. No. 11/491,487, filed on Jul. 24, 2006 and incorporated herein by reference in its entirety. Furthermore, if desired, a start-up burner may provide heat to the stack during start-up of the system via conduit 47.

A method of operating the fuel cell system 1 illustrated in FIG. 1 includes the following steps. During start-up of the fuel cell system, liquid water from water source 21 is vaporized in the heat exchanger 5 using heat from the fuel cell stack. The steam generated in the heat exchanger is provided via conduit 12 into a hydrocarbon fuel inlet stream in conduit 11 to form a humidified hydrocarbon fuel inlet stream. The humidified hydrocarbon fuel inlet stream is reformed in a reformer into a hydrogen containing fuel inlet stream and is then provided to the fuel cells of the fuel cell stack 4 in the hot box 3.

During steady-state operation of the fuel cell system 1, the heat transfer medium, such as water from water source 23, is heated in the heat exchanger 5 using heat from the fuel cell stack. The heated heat transfer medium, such as steam or hot water, is then provided to the facility associated with the fuel cell system.

Alternatively, if desired, the heat exchanger may provide steam to both the fuel cell stack 4 and to the facility 14 at the same time during steady-state operation. Thus, during steady-state operation, the heat exchanger provides steam through both conduits 12 and 13 at the same time. If desired, the steam flowing through conduit 13 may cool on the way to the facility 14, such that hot water instead of steam is provided to the facility 14.

Preferably, the cathode exhaust stream of the fuel cell stack is used to vaporize the water during the start-up of the fuel cell system and to heat the heat transfer medium (i.e., to generate steam or hot water) during the steady-state operation of the fuel cell system. The cathode exhaust stream may be provided through the heat exchanger 5 in a cathode exhaust conduit 15 extending from a cathode exhaust of the fuel cell stack.

In the configuration of FIG. 2, during start-up of the fuel cell system, water is provided from water source 21 through the process steam conduit 19. The steam generated in the process steam conduit 19 in the heat exchanger 5 is provided into the hydrocarbon fuel inlet stream in conduit 11. During steady-state operation of the fuel cell system, water from water source 25 is provided through a heat transfer medium conduit 23. The steam or hot water generated in the heat transfer medium conduit 23 in the heat exchanger 5 is provided to a heating system of the facility 14.

In the configuration of FIG. 3, during start-up of the fuel cell system, water is provided through the steam conduit 29. The steam generated in the steam conduit 29 is provided into the hydrocarbon fuel inlet stream in conduit 11 through conduit 12. During steady-state operation of the fuel cell system, water is still provided through the steam conduit 29. The hot water or steam generated in the steam conduit 29 in the heat exchanger 5 is provided to the heating system of the facility 14 through conduit 13.

The anode exhaust from the fuel cell stack 4 in the hot box 3 provided through conduit 41 may be used to heat the air inlet stream in conduit 39 using the heat exchanger 43. If desired, the anode exhaust stream may be recycled from conduit 41 into the fuel inlet stream in conduit 11 by using the recycle conduit 45.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a cathode exhaust stream through a cathode exhaust conduit, wherein the cathode exhaust conduit extends from a cathode exhaust of a fuel cell stack through a heat exchanger;
providing water through a steam conduit which is thermally integrated with the cathode exhaust conduit in the heat exchanger, wherein the steam conduit has a first outlet fluidly connected to a fuel inlet conduit and a second outlet fluidly connected to a heating system of a facility associated with the fuel cell system;
during start-up of the fuel cell system, outputting steam generated in the steam conduit through the first outlet, wherein the output steam is provided to a hydrocarbon fuel inlet stream in the fuel inlet conduit; and during steady-state operation of the fuel cell system, outputting steam or hot water generated in the steam conduit through the second outlet, wherein the output steam is provided to the heating system of the facility.

2. The method of claim 1, wherein the steam conduit is coiled around the cathode exhaust conduit in the heat exchanger.

3. A method of operating a fuel cell system, comprising:

during start-up of the fuel cell system, vaporizing liquid water in a process steam conduit in a heat exchanger to generate steam using heat from a fuel cell stack of the fuel cell system, and outputting the steam generated in the process steam conduit into a hydrocarbon fuel inlet stream to form a humidified hydrocarbon fuel inlet stream;

during steady-state operation of the fuel cell system, heating water in a heat transfer medium conduit in the heat exchanger using heat from the fuel cell stack; and during the steady-state operation of the fuel cell system, initiating outputting the heated water from the heat transfer medium conduit to a facility associated with the fuel cell system, wherein the water provided through the process steam conduit and the water provided through the heat transfer medium conduit are provided from a single external source.

4. The method of claim 3, further comprising:

ceasing outputting steam generated in the heat exchanger into the hydrocarbon fuel inlet stream during the steady-state operation of the fuel cell system, wherein output from the heat exchanger is provided only to the facility associated with the fuel cell system.

5. The method of claim 3, further comprising:

continuing outputting the steam generated in the heat exchanger into a hydrocarbon fuel inlet stream during the steady-state operation of the fuel cell system to form a humidified hydrocarbon fuel inlet stream.

6. The method of claim 3, further comprising reforming the humidified hydrocarbon fuel inlet stream into a hydrogen containing fuel inlet stream, and providing the hydrogen containing fuel inlet stream to fuel cells of the fuel cell stack during the start-up of the fuel cell system.

7. The method of claim 6, further comprising using a cathode exhaust stream of the fuel cell stack to vaporize the water during the start-up of the fuel cell system and to heat the heat transfer medium during the steady-state operation of the fuel cell system.

8. The method of claim 7, wherein the heat transfer medium comprises water and the step of heating the heat transfer medium comprises one of vaporizing the water into steam and heating the water.

9. The method of claim 8, further comprising:

providing the cathode exhaust stream through a cathode exhaust conduit extending from a cathode exhaust of the fuel cell stack through the heat exchanger;

during the start-up of the fuel cell system, providing water through the process steam conduit which is thermally integrated with the cathode exhaust conduit in the heat exchanger; and during the steady-state operation of the fuel cell system, providing water through the heat transfer medium conduit which is thermally integrated with the cathode exhaust conduit in the heat exchanger.

10. The method of claim 9, wherein the process steam conduit and the heat transfer medium conduit coil around the cathode exhaust conduit in the heat exchanger.

11. The method of claim 3, wherein the fuel cell stack comprises a SOFC stack.

* * * * *